US008315733B2

(12) United States Patent
Hales, Jr. et al.

(10) Patent No.: US 8,315,733 B2
(45) Date of Patent: Nov. 20, 2012

(54) APPARATUS AND METHOD FOR MARKETING PRODUCTS, DISTRIBUTING PRODUCT SAMPLES AND CAPTURING CONSUMER PERSONAL DATA

(76) Inventors: Walter Hales, Jr., Pittsburgh, PA (US);
Michael Panson, Pittsburgh, PA (US);
Leonid Foshansky, San Diego, CA (US)

( * ) Notice: Subject to any disclaimer, the term of this patent is extended or adjusted under 35 U.S.C. 154(b) by 476 days.

(21) Appl. No.: 12/426,388

(22) Filed: Apr. 20, 2009

(65) Prior Publication Data
US 2009/0212067 A1 Aug. 27, 2009

Related U.S. Application Data

(63) Continuation-in-part of application No. 11/473,709, filed on Jun. 23, 2006.

(51) Int. Cl.
*G06F 17/00* (2006.01)
(52) U.S. Cl. .......... 700/242; 700/231; 700/232; 221/24; 221/92; 221/150 R
(58) Field of Classification Search .............. 221/150 R, 221/24, 92; 700/231, 232, 242
See application file for complete search history.

(56) References Cited

U.S. PATENT DOCUMENTS

| 4,668,150 | A | * | 5/1987 | Blumberg | 221/195 |
|---|---|---|---|---|---|
| 4,889,210 | A | * | 12/1989 | Alcaraz et al. | 186/38 |
| 5,210,387 | A | * | 5/1993 | Smith et al. | 221/150 HC |
| 5,322,187 | A | * | 6/1994 | Zizola | 221/150 R |
| 6,415,951 | B2 | * | 7/2002 | Dessing et al. | 221/150 R |
| 6,777,654 | B1 | * | 8/2004 | Greenburg | 221/150 HC |
| 6,779,684 | B2 | * | 8/2004 | Shin | 221/150 R |
| 6,830,160 | B2 | * | 12/2004 | Risolia | 705/14.5 |
| 6,840,399 | B2 | * | 1/2005 | Chirnomas | 221/7 |

* cited by examiner

*Primary Examiner* — Timothy Waggoner
(74) *Attorney, Agent, or Firm* — James Ray & Assoc

(57) ABSTRACT

An apparatus for distributing at least one product to consumers includes a housing and a plurality of belt conveyors for storing a predetermined quantity of such product. A serving tray is positioned externally to the housing for incrementally receiving one of the predetermined quantity of such product. Another belt conveyor is provided for incrementally obtaining such one of such product and for delivering it to the serving tray. A controller for selectively operating storage and delivery conveyors. A manually operable switch activates the controller to operate the delivery conveyor in order to deliver such one of such product. The apparatus is capable of capturing consumer personal data. Various methods contemplate use of these devices for delivering targeted marketing information, distributing product samples and for cross-marketing products.

10 Claims, 9 Drawing Sheets

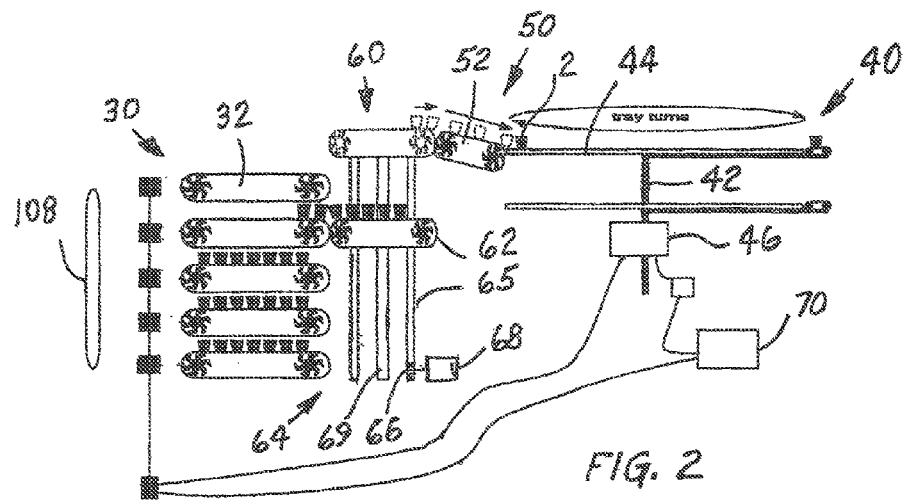
FIG. 2
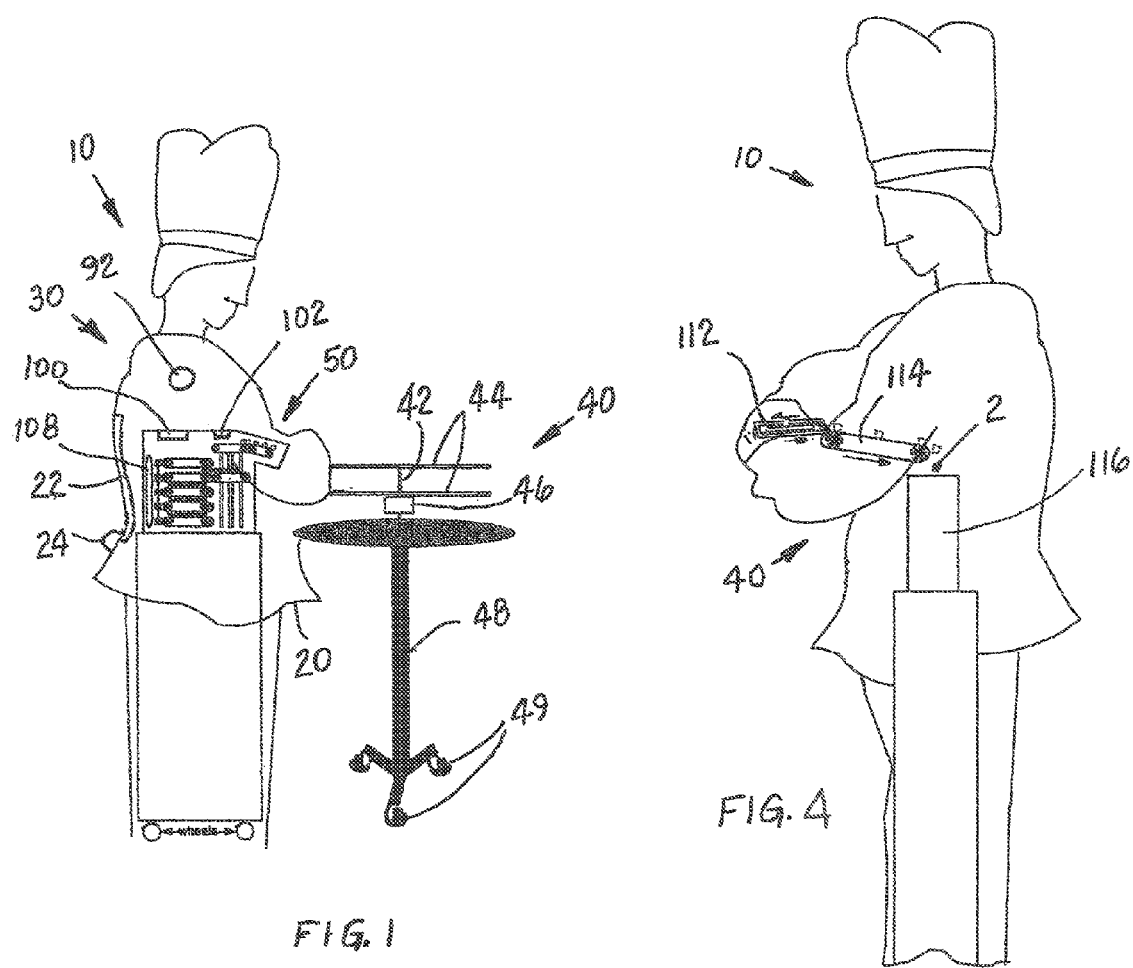
FIG. 1
FIG. 4

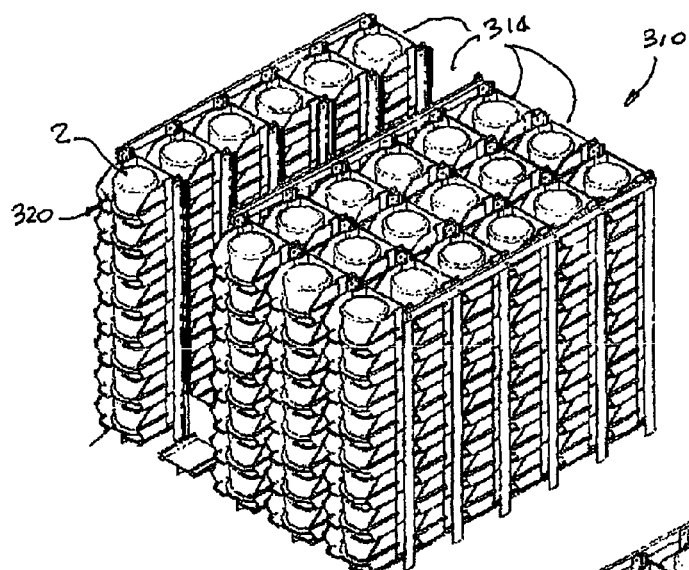
FIG. 8
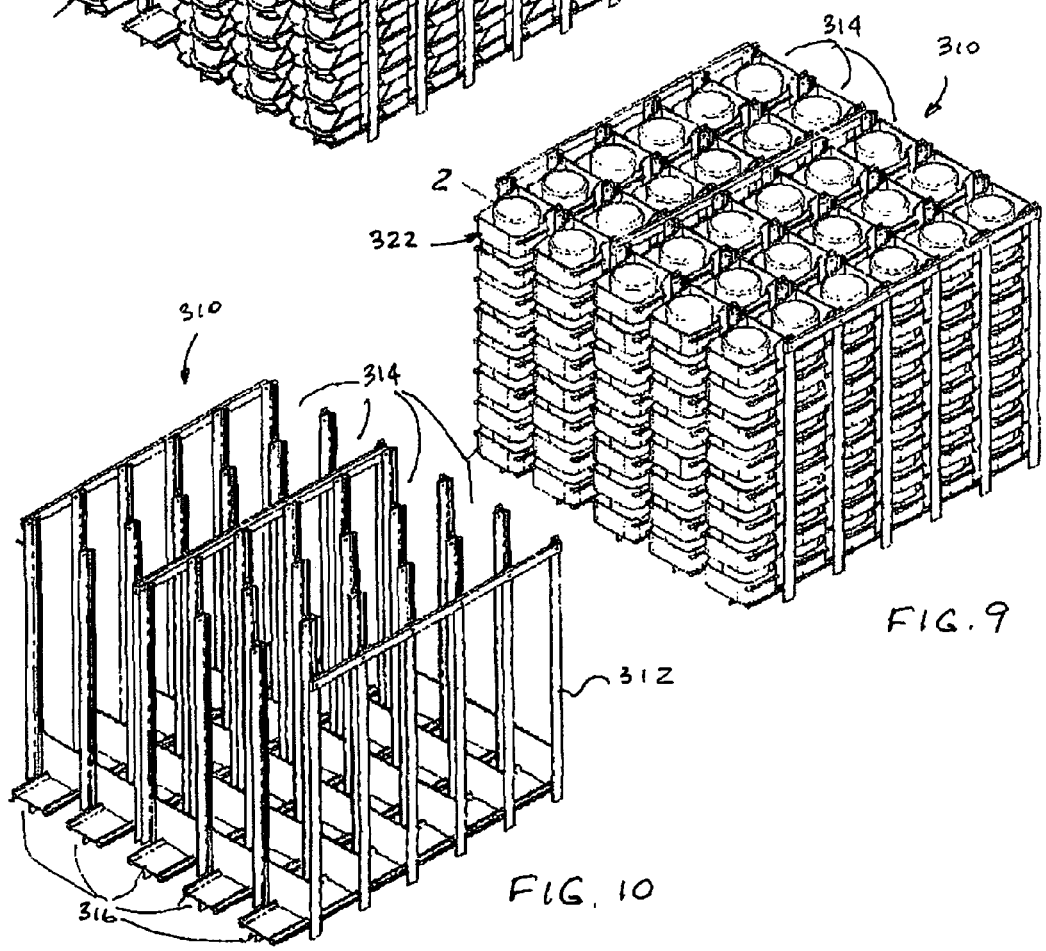
FIG. 9
FIG. 10

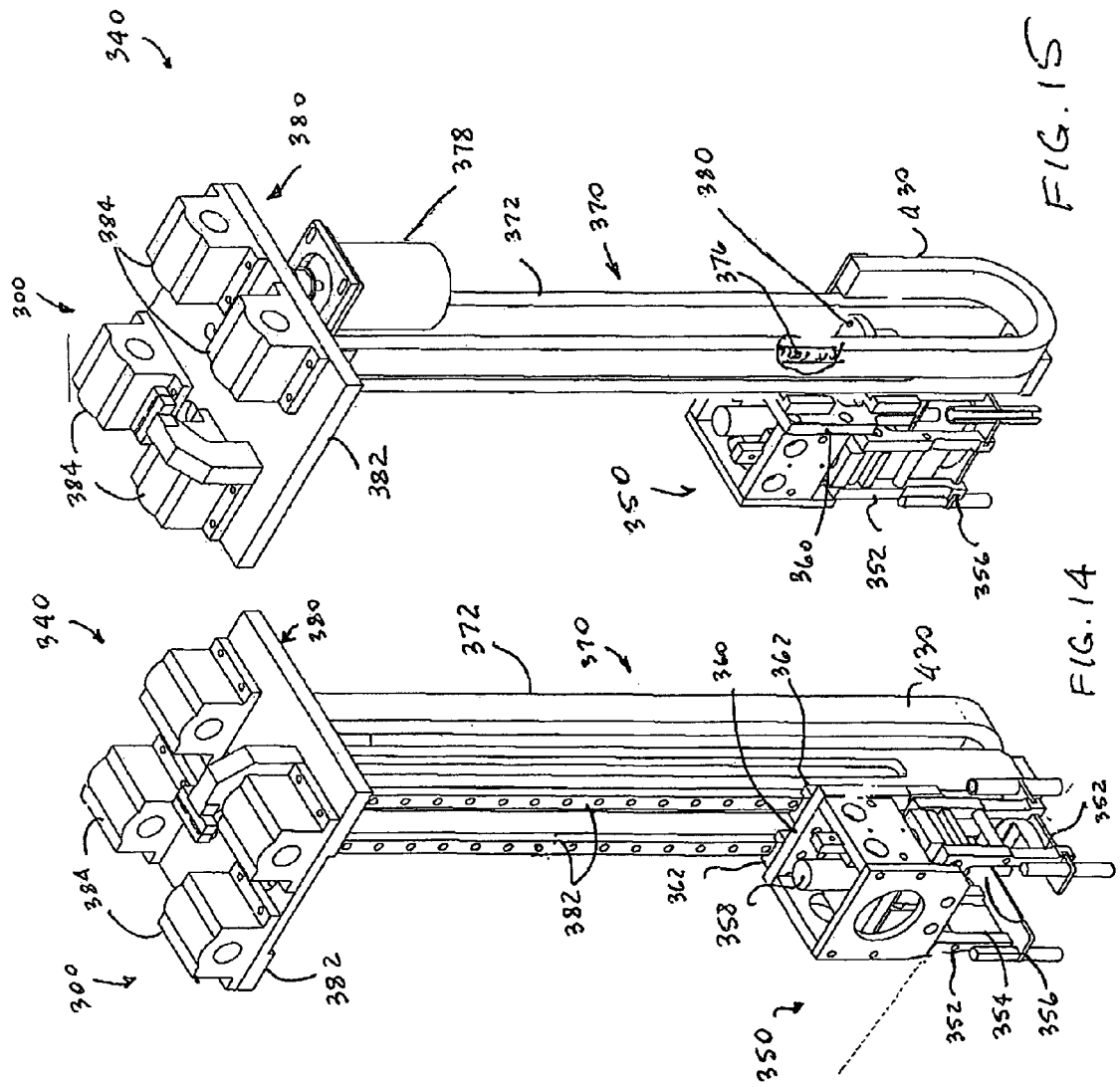

APPARATUS AND METHOD FOR MARKETING PRODUCTS, DISTRIBUTING PRODUCT SAMPLES AND CAPTURING CONSUMER PERSONAL DATA

CROSS-REFERENCE TO RELATED APPLICATIONS

This application is closely related to and claims priority from Provisional Patent Application Ser. No. 60/693,378 filed Jun. 23, 2005 and is a Continuation-In-Part of U.S. patent application Ser. No. 11/473,709 filed Jun. 23, 2006, co-pending.

FIELD OF THE INVENTION

The present invention relates, in general, to a system for marketing products to consumers and capturing consumer personal data and, more particularly, the present invention relates to a method of marketing products to consumers which employs distribution of product samples by way of robotics and, yet more particularly, the instant invention relates to a system for marketing products to consumers that improves point of selection marketing and cross-marketing of products in retail facilities.

BACKGROUND OF THE INVENTION

As is generally well known, methods of marketing a product in a retail environment, particularly, such as a supermarket employ stations which are positioned in strategic locations for distributing product samples to consumers to taste. The products vary from beverages to cheeses and meats and some of these products are heated or cooked at the station.

Commonly, product marketing information, such as a brochure, is offered to consumers for additional description about the product being tasted. Consumers may also receive a promotional coupon offering financial incentives for buying the product. Presently, such stations are operated by personnel that are hired by a retail establishment, by a distributor or by a marketing agency that is responsible for promoting the product.

There are several disadvantages with the currently employed method for marketing food and beverage products.

One disadvantage is that products that are being heated or cooked are often placed on a serving tray and may remain there for a duration of time which is sufficient to reduce the internal temperature of the product, thus negating the effects of heating or cooking and preventing the consumer tasting the product at its optimal internal temperature recommended for consumption. The product left on the tray for longer than the expected time period is exposed to undesirable bacteria present in the environment or carried by the consumer.

Another disadvantage is that the present methods do not enable the manufacture or the marketing agency to know how many consumers tasted the product or which product the consumer tasted if the station serves more than one distinct product. Some consumers are known to take advantage of free product sample offerings by returning to the station and taking samples multiple times.

The present methods further prevent the manufacturer, distributor, retailer or marketing agency to effectively cross-market product combinations. For example, the consumer that is tasting an ice cream product in the ice cream section may not be aware of cookie sampling in the bakery section, which is typically situated at a different end of the building, if such consumer does not have need to purchase any bakery items.

Additionally, the manufacturer, distributor, retailer or marketing agency is unable to capture product preference data or personal data of each individual consumer sampling a particular product. The presently used store cards are only presented by the consumer at the time of paying for the purchases that may not contain the product or products that such consumer tasted previously at one or more sampling stations. Therefore, it is unknown whether the consumer purchased the marketed product due to earlier tasting of its sample or due to previously established product preference and recognition.

SUMMARY OF THE INVENTION

According to one embodiment, the invention provides an apparatus for distributing at least one product to consumers. The apparatus includes a housing which has each of a predetermined shape and a predetermined size. A storage means is disposed within the housing for storing a predetermined quantity of such at least one product. A serving means is at least partially disposed externally to the housing in a position for incrementally receiving one of the predetermined quantity of such at least one product. A delivery means is at least partially mounted within the housing for incrementally receiving such one of such at least one product and for delivering it to the serving means. A control means is provided for selectively operating the delivery means. An activation means is operable by such consumers to enable the control means to operate the delivery means in order to deliver such one of such at least one product.

According to another embodiment of the invention, there is provided a method of at least one of marketing at least one product to consumers, delivering a product sample to consumers and capturing consumer personal data. The method includes the steps of providing an apparatus capable of storing a predetermined quantity of at least one product and for incrementally delivering one of such at least one product. Then, storing, within the apparatus, at least a portion of the predetermined quantity of the at least one product in a position for delivery to consumers. Next, issuing a request, by consumers using a selection means disposed within the apparatus, to receive the at least one product. The method contemplates receiving, by a control means disposed within the apparatus the request issued by consumers. Then, obtaining one of the at least a portion of the predetermined quantity of the at least one stored product. And finally, delivering such one of the at least a portion of the predetermined quantity of the at least one product onto a serving means for use by the consumers.

According to yet another embodiment of the invention there is provided a method of at least one of marketing a plurality of products to consumers and capturing consumer personal data. The method includes positioning, in preselected locations, a plurality of devices capable of at least one of capturing and recognizing a personal data of each consumer. Then, using any one of the plurality of devices for at least one of capturing and recognizing the personal data of the consumer. The method contemplates using at least one other of the plurality of devices to at least recognize the personal data of the consumer. Finally, the method provides for marketing at least one of the plurality of products to the consumer based on the personal data recognized by the at least other one of the plurality of devices.

According to a further embodiment, the invention provides a method of determining a quantity of consumers present in at least one predetermined location. The method includes the steps of positioning, in the predetermined location, a device capable of sensing a presence of the consumer. Next, using the device to sense presence of the consumer. Then, assigning a count value to each occurrence of sensing the presence of the consumer.

According to another embodiment of the invention, there is provided a method of marketing a plurality of products to consumers present in at least one predetermined location. The method includes the steps of positioning, in the predetermined location, a device capable of sensing a presence of at least one of the consumer and an object. Next, using the device to sense presence of the consumer. Finally, communicating a preselected marketing information upon sensing the presence of the consumer.

OBJECTS OF THE INVENTION

It is, therefore, one of the primary objects of the present invention to provide an apparatus for distributing product samples to consumers.

Another object of the present invention is to provide an apparatus for distributing product samples that are stored in a sanitary environment.

Yet another object of the present invention is to provide an apparatus for distributing product samples when a consumer issues a specific request.

A further object of the present invention is to provide an apparatus for distributing product samples which is capable of capturing personal data of the consumer requesting product sample.

Yet a further object of the present invention is to provide an apparatus for distributing product samples which is also capable of providing marketing and promotional information about the product.

An additional object of the present invention is to provide a method of cross-marketing products.

Another object of the present invention is to provide a method of cross-marketing products based on recognition of personal data of each individual consumer.

Yet another object of the present invention is to provide a method of cross-marketing products based on recognition of a traffic pattern of each individual consumer.

Still another object of the present invention is to provide a method of establishing consumer product preferences.

A further object of the present invention is to provide a method of establishing consumer product preferences by way of capturing and recognizing personal data of each individual consumer.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a side elevation schematic view of an apparatus of the present invention for distributing product samples;

FIG. 2 is a side elevation schematic view of the apparatus of FIG. 1 illustrating various product storage and delivery means of the present invention;

FIG. 4 shows a side elevation schematic view of the apparatus of FIG. 1, particularly illustrating product discarding means of the present invention;

FIG. 8 is an isometric view of a storage means of the apparatus of FIG. 7, particularly illustrating arrangement of reusable trays;

FIG. 9 is an isometric view of a storage means of the apparatus of FIG. 7, particularly illustrating arrangement of disposable trays;

FIG. 10 is an isometric view of a storage means of the apparatus of FIG. 7, particularly illustrating storage rack for holding the trays;

FIG. 14 is a front isometric view of the apparatus of FIG. 13, particularly illustrating a tray gripper assembly and gripper vertical movement assembly;

FIG. 15 is a side isometric view of the apparatus of FIG. 14; and

BRIEF DESCRIPTION OF THE VARIOUS EMBODIMENTS OF THE INVENTION

Figure 3:
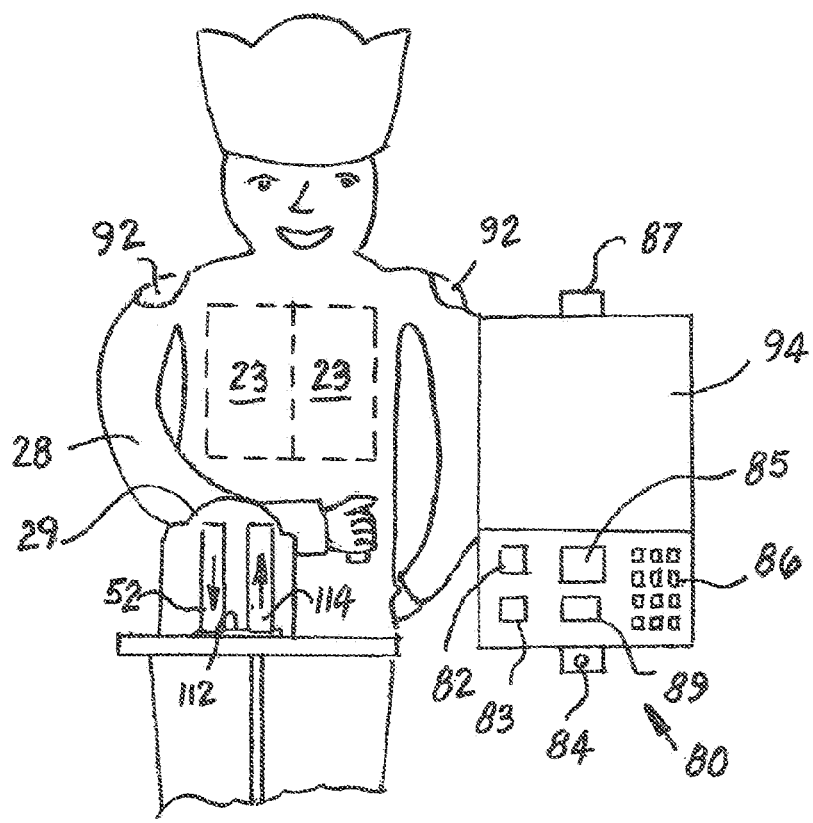
FIG. 3 is a front elevation schematic view of the apparatus of FIG. 1.

Prior to proceeding to the more detailed description of the present invention, it should be noted that, for the sake of clarity and understanding, identical components which have identical functions have been identified with identical reference numerals throughout the several views illustrated in the drawing figures.

Reference is now made, to FIGS. 1-5, wherein there is shown an apparatus, generally designated 10, for distributing at least one product 2 to consumers. According to one embodiment of the invention, the apparatus 10 includes a housing 20 having each of a predetermined shape and a predetermined size. A storage means, generally designated 30, is disposed within the housing 20 for storing a predetermined quantity of such at least one product 2.

According to one embodiment of the invention, the storage means 30 includes a horizontally mounted belt conveyor 32. In the presently preferred embodiment of the invention, such storage means 30 includes a plurality of horizontally mounted powered belt conveyors 32 which are spaced from each other in at least one of a vertical and a horizontal manner.

The apparatus 10 further includes a serving means, generally designated 40, which is positioned for incrementally receiving one of the predetermined quantity of such at least one product 2. Such serving means may be at least partially disposed externally to the housing 20 as best shown in FIG. 1, or may be positioned within the housing 20, for example behind an access door or panel (not shown).

A delivery means, generally designated 50, is at least partially mounted within the housing 20 for incrementally receiving such one of such at least one product 2 and for delivering it to the serving means 40. According to one embodiment of the invention, when such storage means 30 includes one belt conveyor 32, the delivery means 50 includes a powered belt conveyor 52 which is positioned intermediate the belt conveyor 32 and the serving means 40. Alternatively, such delivery means 50 may include an extension of such belt conveyor 32 and positioning one end thereof in a close proximity to the serving means 40.

When the storage means 30 includes a plurality of horizontally mounted powered belt conveyors 32, the delivery means 50 includes at least one powered belt conveyor 52 mounted in a position for delivering such at least one product 2 to the serving means 40 and further includes a transfer means, generally designated 60, for incrementally receiving such at least one product 2 from each belt conveyor 32 and for transferring it to the belt conveyor 52.

Such transfer means 60 includes another powered belt conveyor 62 mounted in a horizontal position and a drive means, generally designated 64, connected to the belt conveyor 62 for vertically moving it between a plurality of first positions, each aligned with a respective one of the plurality of conveyor belts 32 and a second position aligned with delivery means 50, such as the belt conveyor 52.

The drive means 64 includes a combination of at least one cable 65 and pulley 66 being coupled to the belt conveyor 62. The at least one cable 65 is movable in a vertical direction.

An electric motor 68 is coupled to pulley 66 for moving the at least one cable 65 in the vertical direction. A guide rail 69 is coupled to the belt conveyor 62 for maintaining the horizontal position thereof during movement between the plurality of first positions and second positions.

A control means, generally designated 70, is provided for selectively operating storage means 30, the delivery means 50 and the transfer means 60. Preferably, the control means 70 is a microprocessor based controller 70.

An activation means, generally designated 80 and best shown in FIG. 3, is operable by such consumers to enable the control means 70 to operate delivery means 50 in order to incrementally deliver such one of such at least one product 2.

The serving means 40 may be manufactured according to several embodiments of the present invention. According to one embodiment, best shown in FIGS. 1-2, the serving means 40 includes an elongated shaft 42 disposed in a vertical position and mounted for rotational movement. A tray 44 is coupled to the shaft 42 for rotation therewith. An electric motor 46 is provided for rotating the shaft 42. The delivery means 50, being a belt conveyor 52, is positioned in a close proximity to the edge of the tray 44. Even though the serving means 40 is illustrated as having a separate base member 48, which is movable by way of wheels 49, it will be appreciated that the base member 48 may be directly connected to the exterior surface of the housing 20. Furthermore, the serving means 40 may be adapted to include a plurality of trays 44 driven by a single shaft 42 and the electric motor 46.

The activation means 80 may simply include a switch means 82 which is manually operable by such consumers to enable control means 70 to incrementally move the belt conveyor 32 and to transfer such one of the at least one product 2 either directly to the delivery means 50 or first to the transfer means 60.

The activation means 80 may further include a sensor 84 for sensing a presence of such consumers. The sensor 84 is coupled to control means 70 and enables delivery of such at least one product 2 when the consumer is positioned within a predetermined distance of the sensor 84. Sensor 84 may be selected from the group of including but not limited to motion detection, radio frequency, proximity, magnetic, optical, biological and biometric.

The sensor 84 may be selected to sense presence of any consumer walking by the apparatus 10 within the predetermined distance or it may be selected to only sense consumers that are interested in receiving such at least one product 2 and are positioned adjacent said apparatus 10. Upon sensing a presence of the consumer, the control means 70 will activate the audio means 90, including a pair of speakers 92, which are integrated into the apparatus 10 or which are mounted in close proximity thereto for delivering product marketing information.

It will be appreciated that any other input devices, for example such as camera, a light beam, speech recognition, biometric sensors may be employed in the present invention for enabling incremental delivery of such one of such at least one product 2.

Alternatively, the controller 70 may intermittently operate the audio means 90 and the pair of speakers 92 for soliciting such consumers to receive such at least one product 2. Accordingly, when the consumer expresses an interest and moves towards the apparatus 10, the sensor 84 will sense the presence of such consumer.

Preferably, the apparatus 10 further includes a display means 94 which is mounted either internally or externally to the apparatus 10. The internally disposed display means 94 is viewable from the exterior surface of the housing 20. At least a portion of the activation means 80 may be disposed within the display means 94. As is well known, such display means 94 may be manufactured as a touch screen 94.

In order to store such at least one product 2 at its optimum temperature environment, the apparatus 10 further includes means 100 which is disposed within the housing 20 for at least one of heating and cooling such at least one product 2 stored within the housing 20. Accordingly, a temperature sensing means, such as a temperature sensor 102, is mounted within the housing 20 and is coupled to the control means 70 for sensing a temperature of an environment internal to the housing 20.

Such measured temperature is processed by control means 70 in order to regulate operation of the temperature means 100. Such means 100 may be a Peltier device (not shown). It will be appreciated that the temperature means 100 may be simply configured to maintain a predetermined temperature of such at least one product 2 stored within the storage means 30.

The apparatus 10 may further include an optional alarm means 104 coupled to control means 70 for annunciating a first condition wherein the sensed internal temperature is less than a preselected lower temperature threshold and a second condition wherein the internal temperature is greater than a preselected upper temperature threshold. The control means 70 may be adapted to terminate delivery of such at least one product 2 associated with the at least one of the first condition and the second condition in response to the sensed temperature.

The alarm means 104 may include but is not limited to audio, light, remotely transmitted message, report, dialed phone number and the like.

It is contemplated that the housing 20 may include a plurality of chambers 23 each provided with its own storage means 30 and temperature means 100 for storing and delivering products at different temperatures. For example, one chamber 23 may be employed for storing a first product such as a cracker at room temperature and the other chamber may be employed for storing a second product such as cheese at a cooler temperature. The delivery means 50 and transfer means 60 are then adapted to deliver such first and second product and the delivery of each product may be optionally sequenced and programmed to deliver a combination of cheese position on top of the cracker.

It will be understood that such at least one product 2 may be placed onto such storage means 30 through an access door 22 attached to a predetermined portion of housing 20. Preferably, access door 22 is provided with a lock means 24 and it is further preferred for apparatus 10 to detect an unauthorized access to such at least one product 2 stored within housing 20.

For example, a scanner 83, such as a fingerprint scanner, provided in combination with or integrated into the switch 82, may be used to identify and authorize access to the storage means 30 prior to activating lock means 24. Accordingly, an alarm means 104 may be adapted to annunciate the unauthorized access when the lock means 24 is improperly accessed.

The control means 70 may be further adapted to terminate delivery of such at least one product 2 when the unauthorized access is detected. Preferably, the activation means 80 may include a keypad 86 and such alarm means 104 may be simply responsive to an incorrect access code entered by way of such keypad 86. The control means may further terminate delivery of product 2 in response to a failed apparatus 10, such as UV light assembly, employed for sanitizing surfaces of the storage means 30 that contact such at least one product 2.

Figure 5:
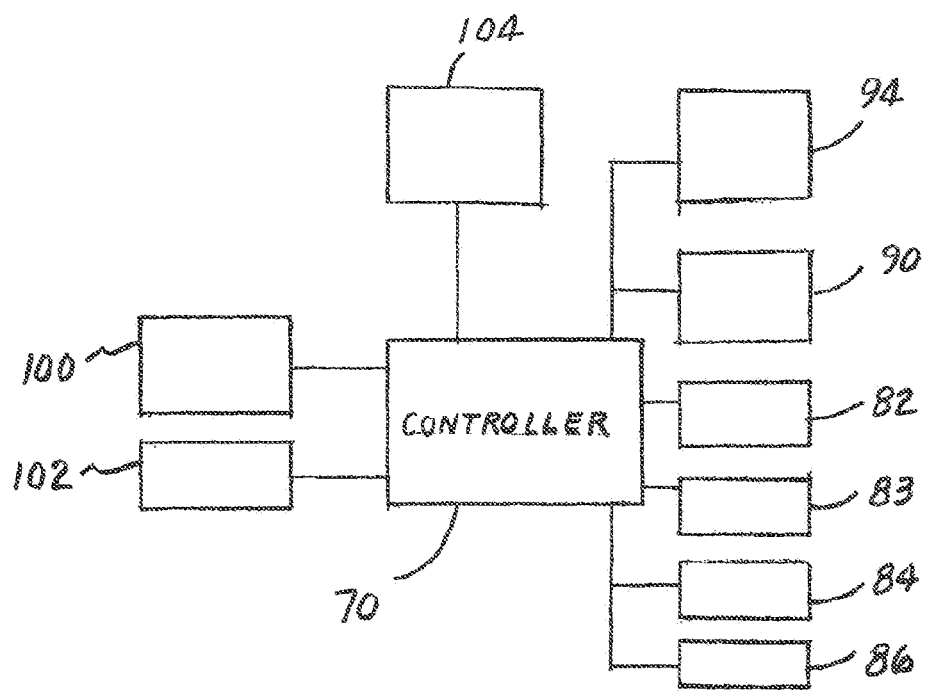
FIG. 5 is a schematic control diagram of the apparatus of FIG. 1.

Furthermore, the apparatus 10 may be adapted for discarding an unused product 2 requested by such consumer. By way of example of FIG. 5, the apparatus 10 includes a product discarding means, generally designated 110, which has a first conveyor 112 mounted adjacent the serving means 40 for receiving such at least one product 2 from delivery means 50 and for moving such at least one product 2 in a first direction and a second conveyor 114 for receiving such at least one product 2 from the first conveyor 112 and for moving it in a second direction and depositing the at least one product 2 into a refuse container 116 which is shown in FIG. 5 as being internally mounted, but may be mounted external to the housing 20. Advantageously, the use of conveyors 112 and 114 may eliminate the need for a powered serving means 40.

It will be appreciated that the apparatus 10 constructed according to various embodiments described supra is advantageous for storing and delivering at least one product 2 in a sanitary condition which eliminates contamination of and tempering with such at least one product 2.

Furthermore, the predetermined shape of the housing 20 may imitate an appearance of one of a character, object, animal and/or person. Preferably, the predetermined shape of the housing 20 is the imitated appearance of a person disposed in an upright standing position and wherein the serving means 40 is located adjacent an aperture 29 formed in an arm portion 28 of the imitated person and wherein the delivery means 50 communicates with the aperture 29 to deliver such at least one product 2 onto the serving means 40.

For example, an imitation of a chef may be appealing to consumers requesting the delivery of such at least one product 2 by providing an appearance of such product 2 being prepared directly in front of the consumer. An imitation of a pizza delivery person may be appealing for consumers requesting the delivery of a pizza product sample.

The character can be presented in many different ways including but not limited to a large doll, a cartoon character, a historical character, a mythical character, a fabled character, a mannequin, a video display, indicia and the like.

For example, the housing 20 formed in a shape of Winnie the Pooh character may be provided for marketing a honey product. Furthermore, the sound generated by the audio means 90 may compliment the appearance of the apparatus 10 making such apparatus 10 more lifelike and appealing to consumers.

To enable mobility of the apparatus 10, a plurality of wheels 120 are attached to a bottom surface of the housing 20.

It will be apparent to those skilled in the art that when the apparatus 10 is capable of delivering a plurality of products stored within the storage means 30, the keypad 86 may be employed as a selection means operable by such consumers for selecting a particular one of the plurality of products 2.

According to another embodiment, the present invention provides a method of at least one of delivering marketing information to consumers, delivering at least one product sample to consumers and capturing consumer preference or personal data.

The method includes a step of providing an apparatus capable of storing a predetermined quantity of at least one product 2 and incrementally delivering one of the at least one product 2. It is presently preferred, that apparatus 10 according to the above described embodiments is employed in the method. At least a portion of the predetermined quantity of the at least one product is stored in a position for delivery to consumers. The method enables consumers to issue a request by way of the activation means 80 to receive a sample of the at least one product 2. Such request is received by the control means 70. The method enables obtaining one of the at least a portion of the predetermined quantity of the at least one product 2. Finally, such one of the at least a portion of the predetermined quantity of the at least one product 2 is delivered onto the serving means 40 for use by interested consumers.

Presence of consumers being in close proximity to the apparatus 10 may be sensed by sensor means 80 disposed within such apparatus 10 and enable the control means 70 to activate the audio means 90 or the display means 94 in order to deliver promotional material content and to solicit consumers being present in close proximity to the apparatus 10 for requesting the at least one product 2.

When requesting the delivery of at least one product 2, the consumer may receive promotional material in a form of a discount or rebate coupon in combination with delivery of such at least one product 2. Such coupon may be delivered, for example, by the printer means 85 mounted within the apparatus 10. The promotional material may be also in a form of one or more recipes using the at least one product 2 requested by the consumer, a location of one or more products within the store, product ingredients, contests, and other information.

The present invention also contemplates that such promotional material may be related to additional products that may be used in combination with the least one product 2 requested by the consumer. For example, when such at least one product 2 is a bagel sample, the promotional material may be related to cream cheese products that are often consumed in combination with the bagel.

It is also within the scope of the present invention to deliver promotional information to a device specified by the consumer. By way of an example only, the consumer may use the keypad 86 (or any other available input devices) to enter e-mail address, internet address or a phone number. The method also allows the consumer to send or input data from any of the devices stated above that permit the sending of data The marketing information may be delivered in at least one format including but not limited to text, audio, images and video.

The devices for receiving such marketing information may include but not limited to cell phones, PDAs, mp3 players, IPODs, or other communications and/or data-receiving devices. Thus, the promotional information may be delivered by emailing, telecommunications, cellular communication, and other RF and wireless communication methods utilizing one or more networks including the internet, intranets, telecommunications, cellular and other available networks.

The promotional material may be delivered to a remote computer or remote device of the user that is located, for example, at the user's home. The consumer may also receive this information while in the store, for example, on their cell phone via cellular telecommunications, the internet, an intranet, and other RF, wireless and wired transmission methods.

The marketing information or promotional material may be delivered based on an information from a database that is already available on the individual consumer, such as in a loyalty card database, to send or communicate with the user's device.

The method also provides for the user to receive marketing information on a recurring, periodic basis.

The method, using one or more of the communications methods above may permit interactive communications with the user's device. The method may also permit transfer of these communications, with a user's device, to a remote data and, in addition to the previously mentioned communications formats, may provide for voice-communication using methods such as VOIP (voice over internet protocol) with the user.

It is contemplated that the user may be able to initiate communications by using any of the various inputting methods described above or the user may initiate communications via any of the devices referred to above that permit the sending as well as receiving of data and/or voice. Voice recognition may also be used as a means of identifying the users and authorizing access to certain system features.

The method also contemplates use physical hardware as part of the system design that allows the user to insert their device, such as a communications dock, or connect their device, via a cable or adapter for communicating to the device including downloading information to the user as well downloading information to the system. The method may also provide infrared or similar means to download information between the user's device and the apparatus 10.

The consumers may be connected to a live person positioned in a remote location, such as a call center or customer support center, for obtaining additional information about the at least one product 2 that the consumer is interested in or any complimentary products as described above. For example, a camera means 87 and a microphone means 89 may be provided for enabling a video conferencing between the consumer and such live person positioned in the remote location and that will appear on the display 94. Or the speaker means 89 may be used by the consumer for audio conferencing only.

It will be understood by those skilled in the art that marketing of any product is most effective and successful in what is known as a targeted marketing delivery method, wherein marketing information is delivered to consumers who are considered as most likely to purchase such product.

The apparatus 10 of the present invention is advantageous in aiding such targeted marketing by providing a capability to capture preselected personal data of consumers issuing the request for delivery of such at least one product 2. The personal data may include at least one biometric parameter being captured when the consumer issues the request. For example, the fingerprint scanner 83 may be provided for scanning a predetermined finger of the consumer.

Once the consumer's finger has been scanned, the control means 70 is able to identify whether the consumer is a first time user of such apparatus 10 or whether the consumer is a repeat customer having his or her personal data stored within the database coupled to the control means 70. When the personal data is already stored within the database, the apparatus 10 will be capable of delivering promotional information for the product requested by the consumer and any additional product stored therein that has been previously purchased by the consumer or being considered as a product of interest based on a previously established consumer product preference. Advantageously, the camera means 87 may be employed for capturing facial image of such consumer.

Particularly, when the consumer is a first time user, the personal data may be saved to a remote or local database and may be further transmitted for use by at least one of a manufacturer, a distributor, and a retailer of such at least one product 2. Appropriately, control means 70 will be configured to take into consideration all applicable laws, rules and regulations with regards to consumer privacy.

It would be appreciated that other means for capturing personal data of the consumer may be provided within or in combination with the apparatus 10 of the present invention. For example, the apparatus 10 may be adapted with a card reader (not shown) for reading personal data contained on a card (not shown) commonly provided by various retailers.

Such personal data may be further used by the apparatus 10 and, more particularly, by the fingerprint scanner 83 or camera means 89 to determine a quantity of requests issued by the consumer within a predetermined time interval, compare the quantity of requests against a predetermined threshold and determine whether to deliver the at least one product 2 to the consumer based on the quantity of requests issued by the consumer within the predetermined time interval and compared against the threshold. Accordingly, when the number of requests exceeds the threshold, the consumer may be denied delivery of such at least one product 2 so as not to abuse the opportunity to receive a free sample of the at least one product 2. The denial of the request may be annunciated through the audio means 90 or the display 94.

The apparatus 10 of the present invention is advantageous for incrementally tracking a quantity of product 2 being delivered to consumers. Accordingly, the condition wherein, the quantity of such at least one product 2 being stored within the storage means 30 is below a predetermined threshold, will be annunciated for enabling replenishment of the at least portion of the predetermined quantity of product 2. For example, control means 70 may be configured for annunciating a predetermined message through the audio means 90.

According to yet another embodiment of the invention there is provided a method of at least one of marketing a plurality of products to consumers, capturing personal data and capturing consumer preference data. This method includes positioning, in preselected locations, a plurality of devices capable of at least one of capturing and recognizing a personal data of a consumer. Then, using any one of the plurality of devices for at least one of capturing and recognizing the personal data of the consumer.

Next, using at least one other of the plurality of devices to at least recognize the personal data of the consumer. Finally, marketing at least one of the plurality of products to the consumer based on the personal data recognized by the at least other one of the plurality of devices. The method contemplates tracking, by using the plurality of devices, a traffic pattern of the consumer. The method further includes an additional step of generating a record of the traffic pattern of the consumer. The record includes number of consumers passing each of the plurality of devices. The traffic pattern is utilized in promoting at least one additional product to such consumers by using the at least one of audio and video means.

Additional records may be generated to include data on access, tampering, temperature, sampling usage, device activation, sensor activation, product replenishment and the like.

The method provides for coordinating operation of the plurality of the devices and marketing of the plurality of products based on the traffic pattern of the consumer. In order to achieve such coordination, the plurality of devices are connected into a network environment for at least one of routing, managing, and storing the personal data of the consumer and marketing information associated with each of the plurality of products.

The network is one of a local area network, metropolitan area network, wide area network, internet and various combinations thereof. The network may include a server and communication between such network and various devices may be at least one of wired and wireless type. It will be appreciated that the server provides a single location for updating marketing information, for receiving and storing personal data and for managing usage and replenishment of the product samples. Marketing information may also be updated from various remote locations. For example, each manufacturer is connected to a network and transmits marketing information updates for related products which are then distributed to each device and are communicated to the consumers.

As it was stipulated above, the devices may be utilized for delivering a sample of the at least one of the plurality of products and capturing the personal data in combination with a delivery of the sample. Captured personal information may be saved to a database.

It will be apparent to those skilled in the art that the method described above may be simply utilized for determining quantity of consumers present in one predetermined location by positioning, in such predetermined location, a device capable of sensing a presence of the consumer. Then, using the device to sense presence of the consumer. Next, assign a count value to each occurrence of sensing the presence of the consumer.

Furthermore, the method may be employed for marketing a plurality of products to consumers present in one predetermined location by positioning, in such predetermined location, a device capable of sensing a presence of the consumer. Next, using the device to sense presence of the consumer. Then, communicating preselected marketing information upon sensing the presence of the consumer.

Figure 6:
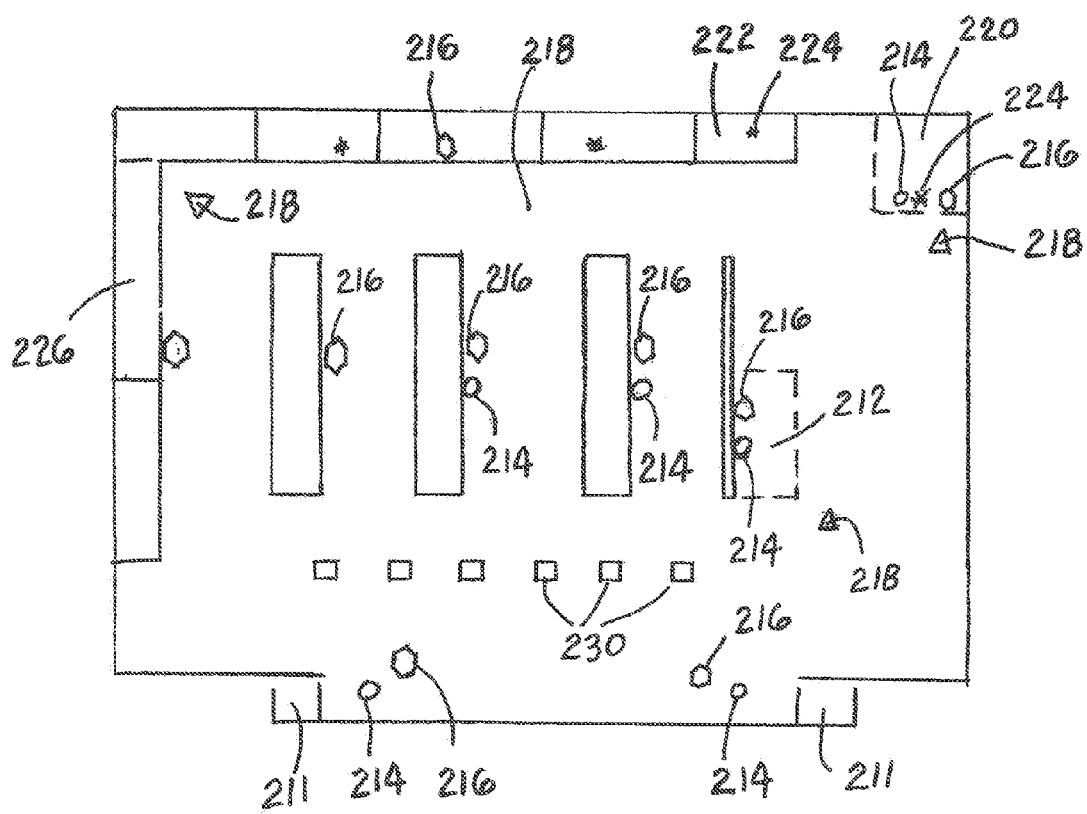
FIG. 6 is a schematic diagram of a system for sensing consumer presence and delivering marketing information.
Figure 7:
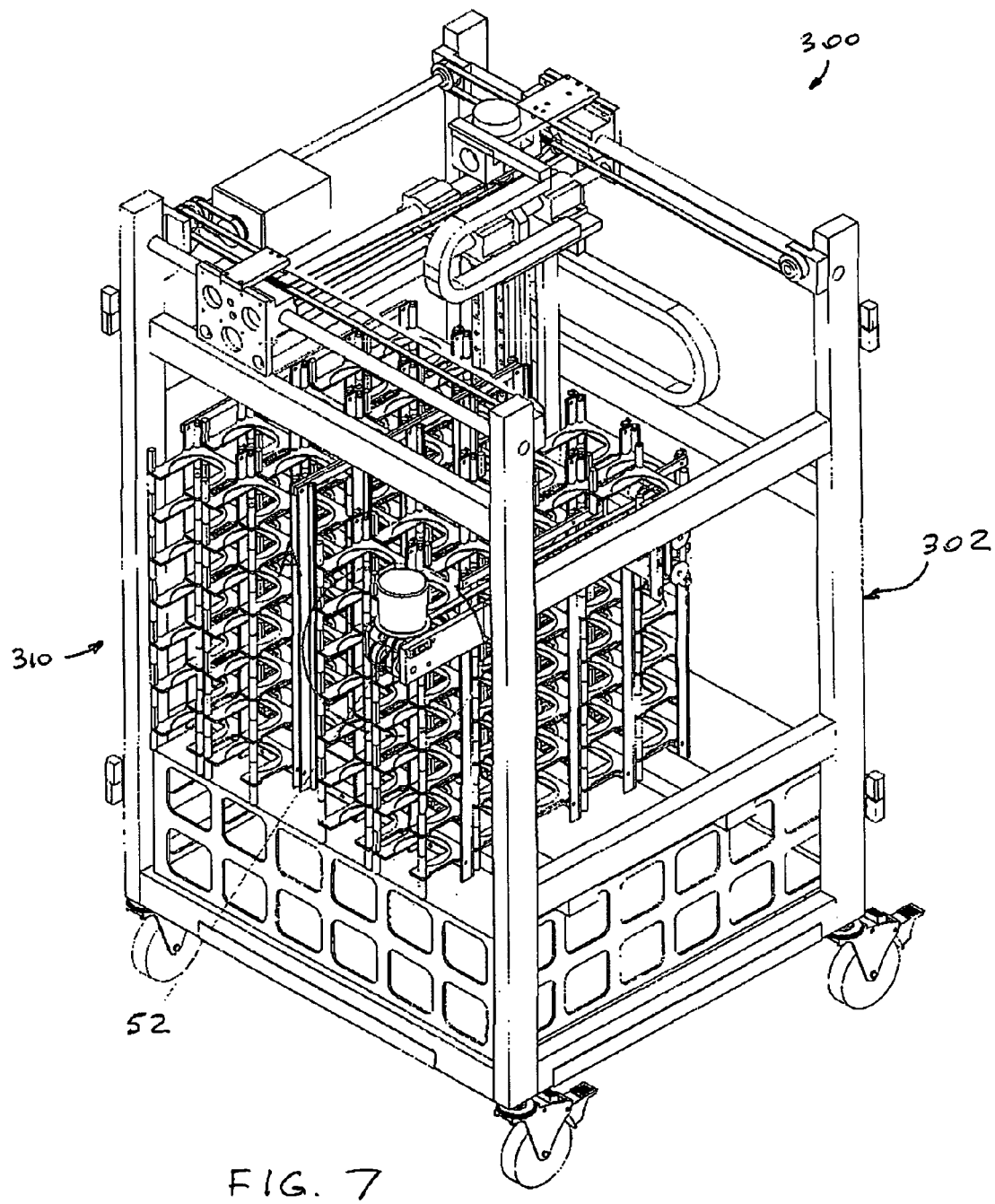
FIG. 7 is an isometric view of the apparatus for distributing product samples that is constructed in accordance with another embodiment of the present invention.
Figure 11:
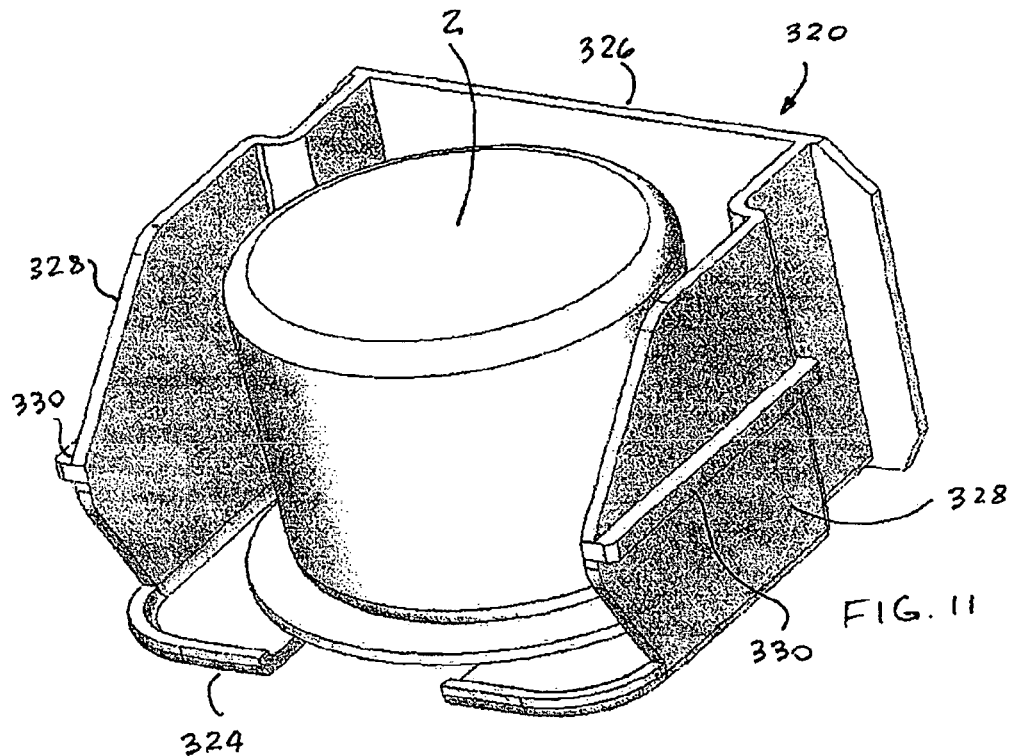
FIG. 11 is an isometric view of a reusable tray employed in the apparatus of FIG. 7.

By way of example of FIG. 6, the method of sensing consumer presence and delivering marketing information to consumers is illustrated below.

A consumer is shopping at the deli department 212 in a grocery store 210. The consumer is shopping in the morning during a weekend. Such consumer may be a mother between the ages of 25 to 35 years old, whose demographic is often referred to as a "soccer mom" as such consumer, tends to shop on weekends, early in the day. Via the motion detector 214 positioned in the deli department, she activates a device 216 capable of delivering a marketing information message which is programmed to play on weekend mornings and which is particularly targeted towards the "soccer mom" audience as well as being appealing to other consumers.

The programmed information message informs the soccer mom that certain meats are great for packing lunches for the family and are on sale. The programmed information message also reminds such consumer not to forget the seasonal products, for example, salad. A device 218 which is constructed according to the embodiments of the device 10 described above may be positioned in close proximity to the deli department 212 for delivering various marketed meat and salad product samples.

Upon listening to such message and trying product samples, the consumer may be influenced to purchase marketed meats and salads. The programmed information message further cross-markets the products that compliment meats and salads, for example, fresh-baked buns at the bakery 220 and cheeses in the nearby imported cheese case 222.

To further attract consumer attention, a light 224 may turn on at the imported cheese case 222 and/or bakery 220 to enable the consumer to simply and easily find the location of cross-marketed products. While at the bakery 220, the soccer mom receives additional information regarding to other bakery items.

For example, she may be enticed to try and purchase cookies. The programmed information message delivered by a second device 216 or a second device 218 positioned in the bakery department 220 may also cross-market other products which are consumable in combination with cookies. For example, it is well known that ice cream and cookies compliment each other and the soccer mom receives additional information regarding the ice cream selection. The soccer mom may use the device 218 positioned within the bakery department 220 to sample ice cream products prior to going into the ice cream area. Or she may sample the ice cream products from the device 218 positioned adjacent ice cream area 226. To further influence purchasing of the cookies and ice cream, their aroma and smell may be released and propagated by device 218, particularly when the cookies are heated.

In the above example sensing consumer presence and delivering marketing information and product samples is performed by distinct devices. The device 214 positioned within the deli department 212 may simply include a sensor, such as the proximity sensor 84, or the camera means 87, for detecting consumer presence.

A controller (not shown) disposed within device 214 is capable of recording and storing each sensor activation as well as total sensor activations within a predetermined period of time. It would be advantageous to adapt the device 214 with means for transmitting the sensor activation counts to a remote location. A second device 216 which is provided for at least distributing marketing information in response to the first device 214 sensing presence of a consumer may be at least one of an audio means 90 and video display 94 and may also include a second controller (not shown) interfaced with the controller of the first device 214. Alternatively, devices 214 and 216 may be integrated into device 218 according to the above described embodiments of the invention.

When the device 214 is positioned in deli department 212 or in bakery department 224 as well as other devices positioned in various areas of the retail establishment 210 are capable of recognizing personal data of the soccer mom, her traffic can be easily monitored and used for marketing additional products as she moves between such various areas. A system of audio and video devices may be used to guide her movement at least based on the last area visited or on the last device used for sampling products.

Thus, when the soccer mom sampled ice cream product from the device 218 positioned within the bakery department 220, the appropriate audio and video devices 216 will be activated to point her immediately to the ice cream area 226 and to reinforce previous product cross-marketing information. In addition to the product marketing information, an ambiance type audio and video information may be provided to the soccer mom as she is walking towards the ice cream area 226.

The operation of various devices 216, 218 is predefined for optimum guidance and cross-marketing of products and to eliminate overlapping and potentially interfering effects of audio messages that may be confusing to the consumer. For example, an audio message may be activated at a predetermined interval after sensing presence of the consumer or capturing his or her personal data. Or, the devices are programmed to deliver marketing information at one location and at specified times and durations while devices in other locations are rendered inoperative. Overlapping and interfering audio messages are eliminated by control and coordination of the volume of such messages in relationship to the volume in other locations.

It is further contemplated that the messages are capable of being delivered based upon specific time of day or period of day, day-of-week, date, and priority in relations to other messages. The priority and content of messages are predetermined to target consumers who are more likely to frequent facilities at particular times of the day.

It will be appreciated that the device 214 capable of recognizing personal data of the consumer may be positioned at the entrance 211 into such retail establishment 210 to capture the personal data immediately upon such consumer entering. Furthermore, consumer personal data and product information captured from barcodes at the checkout counter 230 may be utilized for determining success rate of the marketing effort.

Thus, the method of positioning a plurality of devices provides for at least one of distributing product marketing information including targeted product marketing and product cross-marketing capabilities, attracting consumer attention and interest, influencing or reinforcing product purchasing, enhancing ambiance of the environment, tracking traffic patterns, capturing personal data and establishing consumer product preferences.

Although the present invention has been shown in terms of delivering product samples and product marketing information within a grocery store, it will be apparent to those skilled in the art, that the present invention may be applied to other environments requiring at least one of delivering product marketing information and product samples.

It is also within the scope of the invention to provide the storage means as a plurality of storage trays positioned in a vertically and horizontally stacked arrangement within a storage frame, each storage containing a single product sample and a robotic-type delivery mechanism capable of delivering the product sample by way of picking the tray and moving it to the delivery belt conveyor 52.

Figure 12:
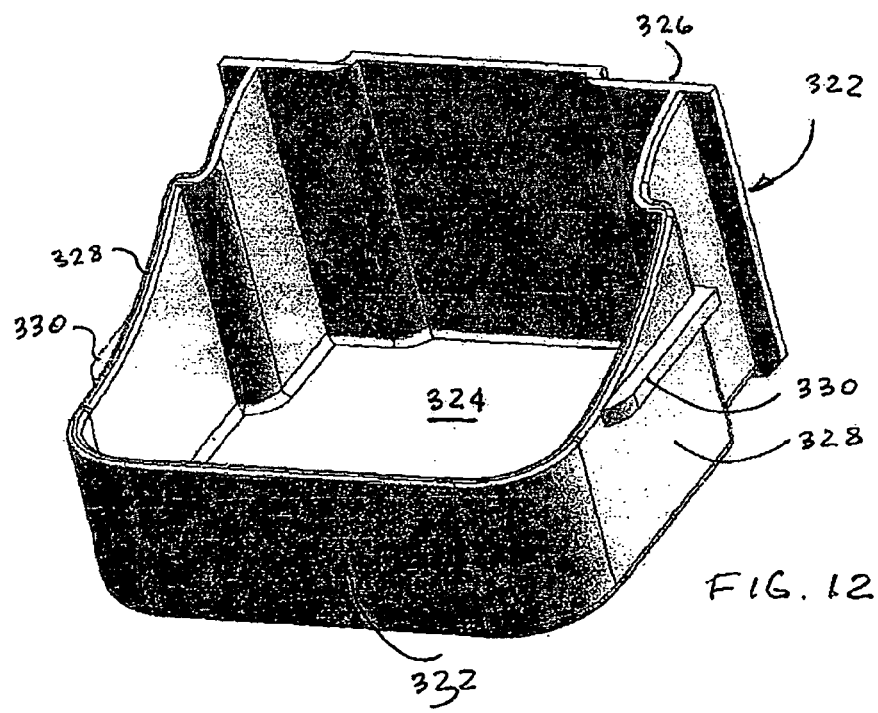
FIG. 12 is an isometric view of a disposable tray employed in the apparatus of FIG. 7.
Figure 13:
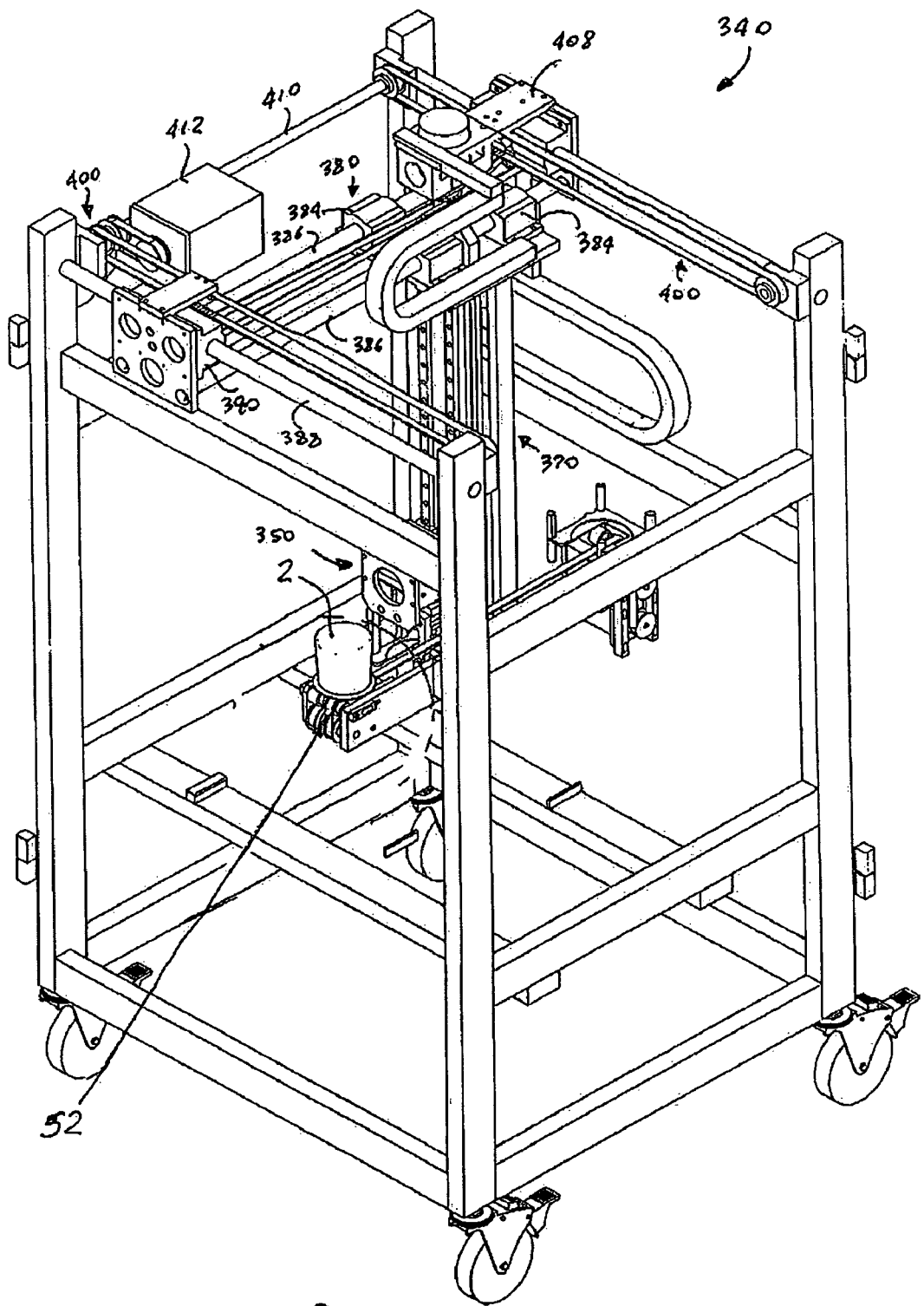
FIG. 13 illustrates the delivery means of the apparatus of FIG. 7.
Figure 16:
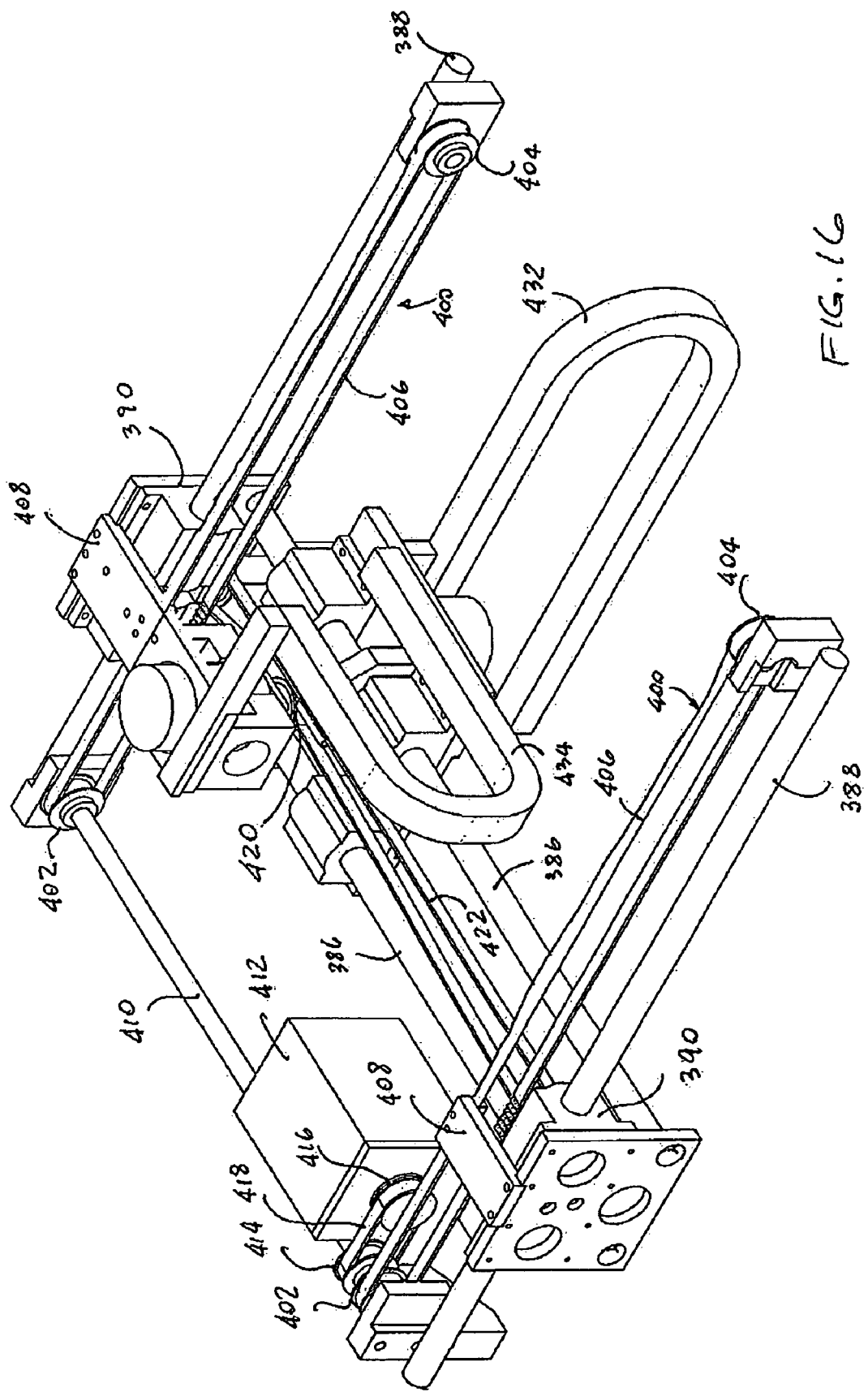
FIG. 16 is an isometric view of the apparatus of FIG. 13, particularly illustrating assembly for moving the tray in a horizontal plane.

Now in reference to FIGS. 7-16 therein is provided an apparatus, generally designated as 300. The apparatus 300 may utilize the above described housing 20 having each of a predetermined shape and a predetermined size. The housing 20 is best shown in FIG. 12 with the exterior skins removed for the sake of clarity and showing the internal frame 302. The apparatus 300 also employs the storage means 310. The storage means 310 is essentially provided as a rack mounted within the frame 302 of the housing 20 and defined by a frame 312, best shown in FIG. 10, having a plurality of storage stack compartments 314. Each storage stack compartment 314 is open at the top and is closed at the bottom by a member 316.

The storage means 310 also includes a plurality of trays. The present invention provides for both reusable and disposable type, 320 and 322 respectively, each adapted for receiving one product sample therein. Each tray 320, 322 has a bottom wall 324, back wall 326 and a pair of side walls 328. Each of the pair of sides has an upstanding elongated rib 330 disposed on an exterior surface of each side wall 328 and oriented in a substantially horizontal direction when such tray 320, 322 is positioned within the storage stack 314. The front of the reusable tray 320 is open, while the front of the disposable container 322 is closed by a front wall 332. When the apparatus 300 only contains the reusable trays 322, one storage stack compartment 314 will be open for storing the empty trays 322 returned from the belt conveyor 52.

The delivery means, generally designated as 340, is provided for picking the tray and moving it in each of vertical and horizontal directions to the product conveyor belt 52. The delivery means 340 includes a gripper assembly 350, best shown in FIGS. 14-15. The gripper assembly 350 has a pair of vertical side members 352 pivotally mounted at upper ends thereof, a plurality of elongated grooves 356, each of the plurality of elongated grooves 356 disposed on an inner surface 354 of a respective one of the pair of vertical side members 352 and sized for receiving the elongated rib 330 therewithin, an electrically operable solenoid 358, an electrically operable solenoids 358 having a movable portion thereof connected to each of the pair of vertical side members 352 so that when the solenoid 358 is energized, the bottom ends of the side members 352 rotate outwardly and either release or grip the elongated ribs 330. There is also a back member 360 and a pair of guides 362 disposed on an exterior surface of the back member 360.

The delivery means 340 further includes means, generally designated as 370, for moving the gripper assembly 350 in a vertical direction. Such means 370 includes an elongated hollow frame 372 disposed in the vertical direction. A drive screw 376 is mounted in the vertical direction for rotation within the hollow portion of the frame 372. A motor 378 is coupled to one end of the drive screw 376. A drive nut 380 is mounted on the drive screw 376 for translation thereabout during rotation thereof, the drive nut 380 having a connection with the back member 360 of the gripper assembly 350. There is also a pair of elongated guide tracks 382 mounted vertically on the frame 372 in respective operative engagement with the pair of guides 362 of the gripper assembly 350.

The delivery means 340 finally includes means, generally designated as 380 for moving the gripper assembly 350 in a horizontal plane, both from side-to-side and front-to-back of the housing 20. In further reference to FIGS. 14-15, the means 380 includes a plate 382 mounted on an upper end of the elongated hollow frame 372. Four first bearing blocks 384 are mounted, in axially aligned pairs, on an upper surface of the plate 382. Now in reference to FIG. 16, there is a pair of first drive shafts 386, each of the pair of first drive shafts 386 is mounted in the horizontal plane on or adjacent an inner surface of a respective side of the housing 20. Each first drive shaft 386 is received within a pair of first bearing blocks 384. There is a pair of second drive shafts 388 disposed in the horizontal plane transverse to the pair of first drive shafts 386. A pair of second bearing blocks 390 is also provided, each of the pair of second bearing blocks 390 is mounted for translation on a respective one of the pair of the second drive shafts 388. Each of the pair of first drive shafts 386 having one end thereof attached to one of the pair of second bearing blocks 390 and having an opposed end thereof attached to an opposed one of the pair of second bearing blocks 390. A pair of belt and pulley assemblies 400 is employed for moving the pair of first drive shafts 386 in one direction within the housing 20. Each of the pair of belt and pulley assemblies 400 has a connection with a respective one of the pair of second bearing blocks 390. In a conventional manner, each belt and pulley assemblies 400 includes a driving pulley 402, an idler pulley 404 and a continuous toothed belt 406. A link 408 is provided and has one end thereof secured to the continuous belt 406 and having a second end thereof attached to a respective one of the pair of second bearing blocks 390. Each driving pulley 402 is mounted in a spaced relationship on a third shaft 410. A motor 412 is also provided and is connected to third shaft 410 with another belt and pulley assembly containing idler puller 414 secured on the third shaft 410 for rotation therewith, an driving pulley 416 secured on the output shaft of the motor 412 for rotation therewith and a continuous toothed belt 418 enveloping pulleys 414, 416.

Another motor assembly 420 is coupled to the plate 382 for moving, by way of the pulley and belt arrangement 422, each of the elongated hollow frame 372 and the gripper assembly 350 carried thereon also in horizontal plane but in a direction transverse to the direction of movement of the second drive shafts 390.

A trio of optional flexible wire guiding tracks 430, 432 and 434 may be also provided for securing and guiding movement of control wires to each of the motors 378, 412 and 420, and to solenoid 358.

In operation to deliver the product sample 2 to the consumer, the gripper assembly 350 is positioned above a selected tray 320 or 322, the solenoid 358 is energized to release the vertical side members 352, the gripper assembly is moved downwardly to align the grooves 356 with elongated ribs 330 and solenoid 358 is de-energized so as to clamp the vertical side members 352 about the side walls 328.

The means 370 and 380 are then activated to move the selected tray 320 or 322 to the delivery conveyor belt 52.

It will be appreciated that the apparatus 300 allows for modular expansion of storage stack compartments 314 and modular expansion of trays 320, 322 without modifying design and operational principle of the apparatus 300. Additional modularity and expansion is achieved by varying the size of the housing 20. The trays 320, 322 may be of a different height and preferably, the height is selected to maximize number of trays 320, 322 within each storage stack compartment 314

The present invention additionally contemplates that the apparatus 10 of the present invention may be utilized for conducting consumer surveys either when a consumer is connected to the live person disposed in a remote location or when the apparatus 10 is equipped with a speech recognition device.

For example, the devices may be installed within a shopping mall to inform a consumer of special promotions offered by various stores and restaurants located within the mall and guide the consumer to stores of interest. The consumer may be solicited to try various food samples offered by the restaurants.

The present invention further contemplates that one part or numerous parts or all of the housing may in various ways move through employment of pneumatically or hydraulically operated devices.

It will be further apparent to those skilled in the art, that other devices may be utilized for storing, transferring and delivering products. For example, the storage means may include a simple tray temporarily and stationary positioned within the housing and the delivery means include a robotic arm capable of obtaining product sample form the tray and delivering it onto the externally positioned serving means. The robotic arm may have a base mounted to an interior surface of the housing 20, for example, such an upper wall, essentially providing for multiple degrees of rotational movements in order to move at least one product 2.

It is further contemplated that a control device or computer may in conjunction with or without one or more sensors direct and control movement. For example, if the invention has the appearance of a person the head may move when someone passes or the mouth may move in conjunction with audio from the invention so as to solicit and provide information to consumers in such a manner as that may attract and encourage a passing consumer to try a sample and take promotional material like a coupon or provide personal information.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. An apparatus for distributing at least one product to consumers, said apparatus comprising:
   (a) a housing having each of a predetermined shape and a predetermined size;
   (b) a storage means disposed within said housing for storing a predetermined quantity of such at least one product, said storage means includes a frame defining a predetermined plurality of vertically disposed stacks, each of said predetermined plurality of vertically disposed stacks open at a top end thereof and closed at a bottom end thereof, said storage means further includes a predetermined plurality of trays positioned within at least one of said predetermined plurality of vertically disposed stacks, each of said predetermined plurality of trays includes a bottom wall, a back wall, a pair of side walls, each of said pair of side walls having an upstanding elongated rib disposed on an exterior surface thereof and oriented in a substantially horizontal direction when said each tray is positioned within said frame;
   (c) a serving means positioned within or in a predetermined relationship external to said housing for incrementally receiving one of such predetermined quantity of such at least one product;
   (d) a delivery means at least partially mounted within said housing for incrementally obtaining such one of such at least one product and for delivering it to said serving means;
   (e) a control means for selectively operating said delivery means; and
   (f) an activation means operable by such consumers to enable said control means to operate said delivery means in order to deliver such one of such at least one product.

2. The apparatus, according to claim 1, wherein said activation means includes a sensor for sensing a presence of each consumer.

3. The apparatus, according to claim 1, wherein said apparatus further includes an audio means for soliciting such consumers to receive such at least one product.

4. The apparatus, according to claim 1, wherein said apparatus further includes means disposed therein for at least one of heating and cooling such at least one product stored within said housing.

5. The apparatus, according to claim 1, wherein said each of said predetermined plurality of trays further includes a front wall.

6. An apparatus for distributing at least one product to consumers, said apparatus comprising:
   (a) a housing having each of a predetermined shape and a predetermined size;
   (b) a storage means disposed within said housing for storing a predetermined quantity of such at least one product;

(c) a serving means positioned within or in a predetermined relationship external to said housing for incrementally receiving one of such predetermined quantity of such at least one product;

(d) a delivery means at least partially mounted within said housing for incrementally obtaining such one of such at least one product and for delivering it to said serving means, said delivery means includes a gripper assembly, means for moving said gripper assembly in a vertical direction, and means for moving said gripper assembly in a horizontal plane, said gripper assembly includes, a pair of vertical side members, a pair of elongated grooves, each of said pair of elongated grooves disposed on an inner surface of a respective one of said pair of vertical side members and sized for receiving said elongated rib therewithin, an electrically operable solenoid having a movable portion thereof connected to each of said pair of vertical side members, a back member, and a pair of guides disposed on an exterior surface of said back member;

(e) a control means for selectively operating said delivery means; and (f) an activation means operable by such consumers to enable said control means to operate said delivery means in order to deliver such one of such at least one product.

7. The apparatus, according to claim 6, wherein said means for moving said gripper assembly in a vertical direction includes:

(a) an elongated hollow frame disposed in said vertical direction;

(b) a drive screw mounted in said vertical direction for rotation within said hollow frame;

(c) a motor coupled to one end of said drive screw;

(d) a drive nut mounted on said drive screw for translation thereabout during rotation thereof, said drive nut having a connection with said back member of said gripper assembly; and (e) a pair of elongated guide tracks mounted on said frame in operative engagement with said pair of guides of said gripper assembly.

8. The apparatus, according to claim 7, wherein said means for moving said gripper assembly in said horizontal plane includes:

(a) a plate mounted on an upper end of said elongated hollow frame;

(b) four first bearing blocks mounted in aligned pairs on an upper surface of said plate;

(c) a pair of first drive shafts, each of said pair of first drive shafts mounted in said horizontal plane on an inner surface of a respective side of said housing and received within a pair of said first bearing blocks;

(d) a pair of second drive shafts disposed in said horizontal plane transverse to said pair of first drive shafts;

(e) a pair of second bearing blocks, each of said pair of second bearing blocks mounted for translation on a respective one of said pair of second drive shafts, wherein each of said pair of first drive shafts having one end thereof attached to one of said pair of second bearing blocks and having an opposed end thereof attached to an opposed one of said pair of second bearing blocks;

(f) a pair of belt and pulley assemblies, each of said pair of belt and pulley assemblies having each of a driving puller, an idler puller, a continuous belt enveloping each of said driving and idler pulleys and a connection with a respective one of said pair of second bearing blocks;

(g) a third shaft having said driving pulleys mounted in spaced apart relationship thereon for rotation therewith;

(h) a first motor assembly having each of a motor, a first pulley mounted on an output shaft of said motor first for rotation therewith, a second pulley mounted on said third shaft for rotation therewith, and a continuous belt enveloping each of said first and second pulleys; and (i) a second motor assembly coupled to said plate.

9. The apparatus of claim 6, further including a belt conveyor having one end thereof extending outwardly past one exterior surface of said housing.

10. The apparatus of claim 6 further comprising wheels mounted to a bottom end of said housing (e).

* * * * *